Patented Mar. 17, 1936

2,034,304

UNITED STATES PATENT OFFICE 2,034,304

AZO DYESTUFFS AND THEIR PRODUCTION

Hans Krzikalla, Ludwigshafen-on-the-Rhine, and Bernd Eistert, Mannheim, Germany, assignors to General Aniline Works, Inc., New York, N. Y., a corporation of Delaware No Drawing. Original application March 3, 1934, Serial No. 713,947. Divided and and this application June 14, 1935, Serial No. 26,697. In Germany March 10, 1933

10 Claims. (Cl. 260—86)

The present invention relates to new azo dyestuffs and a process of producing same. It has been divided out from our copending application Ser. No. 713,947.

We have found that valuable azo dyestuffs soluble in water are obtained by coupling diazotized aromatic amines containing at least one sulphonic acid group with compounds containing the ring system

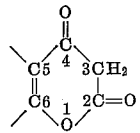

i. e. the ring system of the so-called "pyronone".

Compounds of this kind are for example the 6-alkyl- or 6-cycloalkyl- or 6-aryl- or 6-aralkyl-pyronones, the 5,6-benzo- or 5,6-naphtho-condensed pyronones, such as

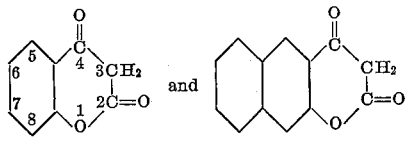

chromane-2,4-dione  benzochromane-2,4-dione
(benzotetronic acid)  (naphthotetronic acid)

as well as their substitution products, such as alkyl, halogen and nitro derivatives.

The monoazo dyestuffs obtainable from these coupling components with the aid of diazo compounds are usually yellow to red. As diazo compounds may be mentioned the sulphonic acids of the diazotized (or tetrazotized) mono- and polyamines of the benzine, naphthalene, anthracene, diphenyl series including their homologues and their derivatives, for example those substituted by halogen, especially chlorine, nitro, hydroxy, methoxy and carboxylic acid groups; sulphonic acids of diazotized aminoazo compounds may also be employed. Mono- dis- and poly-azo dyestuffs may be prepared according to the present invention; in the case of disazo dyestuffs one molecule of a suitable tetrazo compound may be coupled with two molecules of equal or different coupling compounds of the kind defined above or with one molecule of such a compound and one molecule of any other compound capable of coupling.

On the one hand ready-made dyestuffs may be produced according to the present invention by coupling the diazo or tetrazo compounds with the coupling components. The dyestuffs thus obtainable may be used for different purposes, as for example, for dyeing wool, silk, leather and in some cases cotton.

By employing as diazo components sulphonic acids of ortho-hydroxy- or ortho-alkoxyamines, yellow to brown dyestuffs are obtained which may be converted into complex metal compounds by treatment with agents supplying metals, such as chromium, cobalt or copper compounds, in substance or on the fibre; in the case of alkoxy compounds the said treatment is carried out under conditions under which the alkyl group is split off.

Generally speaking, the dyestuffs have a good fastness to light and are distinguished by an excellent levelling power and in many cases a good fastness to washing.

The following examples will further illustrate the nature of this invention but the invention is not restricted to these examples. The parts are by weight.

Example 1

220 parts of 1-methyl-3-amino-6-chlorbenzene-4-sulphonic acid are diazotized in the usual manner and the resulting diazo solution is coupled with 140 parts of 6-methylpyronone (cf. Journal of the Chemical Society, London, 1891, part I, page 608) dissolved in a sufficient amount of soda solution. After salting out with common salt, a yellow dyestuff is obtained which dyes wool beautiful brilliant yellow and very level shades which are fast to washing and fulling. The resulting dyestuff may be laked in the usual manner, for example, with barium salts while adding aluminium sulphate and soda, a beautiful yellow pigment being thus obtained.

Similar dyestuffs may be obtained by employing other aromatic amino sulphonic acids or sulphonated aminoazo compounds as diazo components or by using as coupling components benzo- or naphthotetronic acid (cf. Annalen der Chemie, vol. 367, pages 196 and 262) or 7,8-benzochromane-2,4-dione (obtainable from 1-hydroxynaphthalene-2-carboxylic acids in a manner analogous to that stated in Annalen der Chemie, vol. 367, page 262).

Instead of 6-methyl-pyronone in the present example and in the following ones pyronones may be used as coupling components which contain in the 6-position an aryl or arakyl radicle such as 6-phenylpyronone (obtainable by heating dehydro-benzoyl acetic acid (cf. Berichte der Deutschen Chem. Gesellschaft, vol. 23, page 3727) in 90 per cent sulphuric acid at 135° C.) or 6-benzylpyronone (obtainable in an analogous manner from dehydrophenacetyl acetic acid (obtainable by condensation of 2 molecular proportions of gamma-phenyl acetyl acetic acid ester)).

*Example 2*

450 parts of 1,4'-diamino-3,3'-dimethoxydiphenyl-6,6'-disulphonic acid sodium salt are tetrazotized and the resulting tetrazo compound is coupled with 280 parts of 6-methylpyronone in a solution rendered alkaline with soda. The resulting orange-red disazo dyestuff may be separated by salting out with common salt and may be employed for dyeing silk.

*Example 3*

267 parts of 1-amino-2-methoxynaphthalene-6-sulphonic acid are diazotized and the resulting diazo compound is coupled with 140 parts of 6-methylpyronone in a solution rendered alkaline with soda. The dyestuff may be separated by salting out and yields orange dyeings on wool.

If the dyestuff be treated in the usual manner with agents supplying chromium, as for example chromium formate, under conditions under which a splitting off of the methyl radicle takes place, (for example by heating in a closed vessel at between 110° and 130° C.) a dyestuff containing chromium is obtained which yields very level Bordeaux red dyeings on wool.

*Example 4*

388 parts of 4,4'-diaminodiphenyl-3,3'-disulphonic acid sodium salt are tetrazotized and coupled with 500 parts of naphthotetronic acid while alkaline with soda. The dyestuff dyes cotton orange-red shades.

The dyestuff obtainable in an analogous manner by coupling tetrazotized 4,4-diaminostilbene-3,3'-disulphonic acid with naphthotetronic acid yields at red-brown dyeing on cotton.

*Example 5*

250 parts of the diazo compound of 1-amino-2-hydroxy-naphthalene-4-sulphonic acid are made into a paste with a little ice-cold water and stirred into a solution of 140 parts of 6-methylpyronone in 850 parts of pyridine. The whole is stirred at from 30° to 40° C. until the coupling is completed and then it is acidified with hydrochloric acid. The resulting dyestuff dyes wool very uniform red-brown shades; the dyeing becomes a fast blue-red by aftertreatment with bichromate.

The dyestuff may also be converted in substance into the complex chromium compound by treatment with chromium formate or the like; the dyestuff is then suitable for dyeing animal fibres.

The dyestuff prepared in a corresponding manner from the diazo compound of 1-amino-2-hydroxy-6-nitronaphthalene-4-sulphonic acid and 6-methylpyronone dyes wool very uniform dark brown shades and the chromium compound prepared therefrom in substance or on the fibres yields pale red-brown shades.

*Example 6*

226 parts of 1-hydroxy-2-amino-4-chlorbenzene-6-sulphonic acid are diazotized and coupled with 135 parts of 6-methylpyronone in a solution rendered alkaline with soda. The dyestuff dyes wool very uniform yellow-brown shades; the chromium compound prepared by afterchroming on the fibre or by chroming in substance yields very uniform red-brown shades.

The dyestuff from diazotized 1-hydroxy-2-amino-4-nitrobenzene-6-sulphonic acid and 6-methylpyronone yields very uniform red-brown shades on wool; its chromium compound yields yellow-brown shades.

The dyestuffs may also be employed for dyeing leather and silk.

*Example 7*

244 parts of ortho-dianisidine are tetrazotized in the usual manner with sodium nitrite and hydrochloric acid and the resulting tetrazo solution is added to a solution of 246 parts of 2-hydroxynaphthalene-6-sulphonic acid sodium salt in an amount of soda solution sufficient to neutralize the hydrochloric acid. As soon as the formation of the monoazo dyestuff is completed, a solution of 135 parts of 6-methylpyronone in caustic soda is added. When coupling is completed, the dyestuff is salted out. It dyes cotton violet-blue shades; by aftertreatment with copper sulphate the shade of color becomes somewhat more reddish.

*Example 8*

234 parts of 1-amino-2-hydroxy-3-nitrobenzene-5-sulphonic acid are diazotized in the usual manner and allowed to flow into a solution of 212 parts of naphthotetronic acid rendered alkaline by means of sodium carbonate, while stirring. A dyestuff is obtained giving level violet shades on wool which upon treatment with bichromate change into a brilliant Bordeaux.

If the isomeric 1-amino-2-hydroxy-5-nitrobenzene-3-sulphonic acid is used as diazo component a red violet dyestuff is obtained which by after-chroming yields a beautiful red.

By treating the dyestuffs with agents supplying chromium, for example by heating them for 2 hours with a solution of chromium formate, they may be converted into dyestuffs containing chromium which are suitable for dyeing wool, leather or silk thus yielding shades corresponding to these obtainable by after-chroming.

What we claim is:

1. The process of producing azo dyestuffs which comprises coupling a diazotized aromatic amine containing at least one sulphonic acid group with a compound corresponding to the general formula:

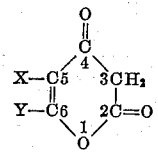

wherein X stands for hydrogen and Y for an alkyl, aryl or aralkyl group or wherein X and Y are members of an aromatic ring system condensed with the nucleus shown.

2. The process of producing azo dyestuffs which comprises coupling a diazotized aromatic amine containing at least one sulphonic acid group with a compound corresponding to the formula:

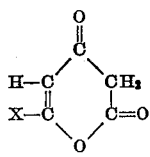

wherein X stands for an alkyl, aryl or aralkyl group.

3. The process of producing azo dyestuffs which comprises coupling a diazotized aromatic amine containing at least one sulphonic acid group with a compound corresponding to the formula:

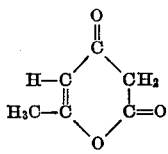

4. The process of producing azo dyestuffs which comprises coupling a diazotized aromatic amine containing at least one sulphonic acid group with a compound corresponding to the formula:

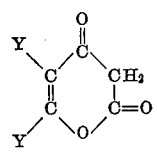

wherein the two Y's stand for members of a condensed aromatic ring system.

5. The process of producing azo dyestuffs which comprises coupling a diazotized aromatic amine containing at least one sulphonic acid group with a compound corresponding to the formula:

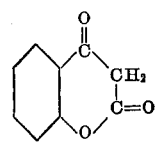

6. The process of producing azo dyestuffs which comprises coupling a diazotized aromatic amine containing at least one sulphonic acid group with a compound corresponding to the formula:

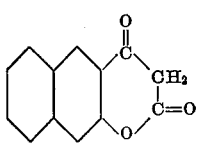

7. Azo dyestuffs containing at least one sulphonic acid group derived from a coupling component which corresponds to the general formula:

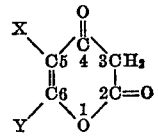

wherein X stands for hydrogen and Y for an alkyl, aryl or aralkyl group or wherein X and Y are members of an aromatic ring system condensed with the nucleus shown.

8. Azo dyestuffs derived from a diazotized aromatic ortho-hydroxy amine containing at least one sulphonic acid group and a coupling component which corresponds to the general formula:

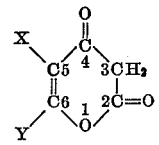

wherein X stands for hydrogen and Y for an alkyl, aryl or aralkyl group or wherein X and Y are members of an aromatic ring system condensed with the nucleus shown.

9. Azo dyestuffs containing at least one sulphonic acid group derived from a coupling component which corresponds to the formula:

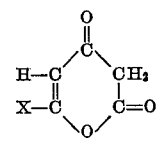

wherein X stands for an alkyl, aryl or aralkyl group.

10. Azo dyestuffs containing at least one sulphonic acid group derived from a coupling component which corresponds to the formula:

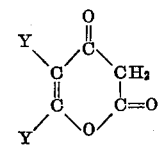

wherein the two Y's stand for the members of a condensed aromatic ring system.

HANS KRZIKALLA.
BERND EISTERT.